(12) United States Patent
Rahman et al.

(10) Patent No.: US 9,699,296 B1
(45) Date of Patent: Jul. 4, 2017

(54) VOICE ASSISTED REQUESTS BETWEEN USER DEVICES

(71) Applicant: Verizon Patent and Licensing Inc., Arlington, VA (US)

(72) Inventors: Masudur Rahman, Somerset, NJ (US); Mohammad Raheel Khalid, Budd Lake, NJ (US); Dayong He, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/980,541

(22) Filed: Dec. 28, 2015

(51) Int. Cl.
*H04M 3/42* (2006.01)
*H04M 1/725* (2006.01)
*H04W 68/02* (2009.01)
*H04W 76/02* (2009.01)

(52) U.S. Cl.
CPC ..... *H04M 1/7255* (2013.01); *H04M 3/42204* (2013.01); *H04W 68/02* (2013.01); *H04W 76/023* (2013.01)

(58) Field of Classification Search
CPC ......... G10L 15/30; G10L 21/06; G10L 13/08; G10L 15/005; G10L 15/26; G10L 13/043; G06F 3/167; G06Q 30/0251; H04L 12/5835; H04L 51/066; H04J 3/24; H04M 11/00; H04M 1/72536; H04M 3/42357; H04M 7/006; H04M 2242/04; H04M 1/7255; H04M 3/42204; H04Q 7/24; H04W 68/02; H04W 76/023

USPC .......... 455/414.1; 710/27; 365/222; 370/465
See application file for complete search history.

(56) References Cited

U.S. PATENT DOCUMENTS

| | | | | |
|---|---|---|---|---|
| 6,934,684 | B2 * | 8/2005 | Alpdemir | G06Q 30/02 379/88.03 |
| 7,317,908 | B1 * | 1/2008 | Eason | H04M 3/53333 379/88.14 |
| 7,894,578 | B2 * | 2/2011 | McClelland | H04M 3/42391 379/45 |
| 8,060,565 | B1 * | 11/2011 | Swartz | G10L 13/00 704/4 |
| 9,230,549 | B1 * | 1/2016 | Popik | G10L 15/30 |
| 2003/0069997 | A1 * | 4/2003 | Bravin | G06F 17/2765 709/250 |
| 2008/0147395 | A1 * | 6/2008 | Da Palma | H04L 12/581 704/235 |
| 2010/0211389 | A1 * | 8/2010 | Marquardt | G10L 19/0018 704/235 |

(Continued)

*Primary Examiner* — Mahendra Patel

(57) ABSTRACT

A wireless communication device may include logic configured to receive a voice request, wherein the voice request includes a request to access information stored in another wireless communication device, a request for device status information associated with the other wireless communication device, or a request to configure an alert trigger in the other wireless communication device; identify the other wireless communication device; convert the received voice request into a text request; send the text request to the other wireless communication device; and receive a response from the other wireless communication device, wherein the response includes the requested information stored in the wireless communication device, the requested device status information, or an indication that the requested alert trigger has been configured.

19 Claims, 13 Drawing Sheets

(56) References Cited

U.S. PATENT DOCUMENTS

| | | | |
|---|---|---|---|
| 2011/0270884 A1* | 11/2011 | Li | G06F 17/30017 707/780 |
| 2012/0096490 A1* | 4/2012 | Barnes, Jr. | G06Q 10/02 725/34 |
| 2014/0118144 A1* | 5/2014 | Amis | G08B 21/02 340/540 |
| 2015/0234636 A1* | 8/2015 | Barnes, Jr. | G06F 3/167 715/728 |

* cited by examiner

VOICE ASSISTED REQUESTS BETWEEN USER DEVICES

BACKGROUND INFORMATION

Users of wireless devices may request information on the Internet using, for example, a mobile browser application running on a wireless device. In order to find information that a user desires, the user may enter a search query into a search bar of the browser application and send a request to a search engine. The search engine may return a set of search results and the user may select one of the search results to access content on the Internet. Many wireless devices provide a voice search option that enables a user to speak or voice a request in order to submit a search query to a search engine.

DETAILED DESCRIPTION OF PREFERRED EMBODIMENTS

Figure 1:
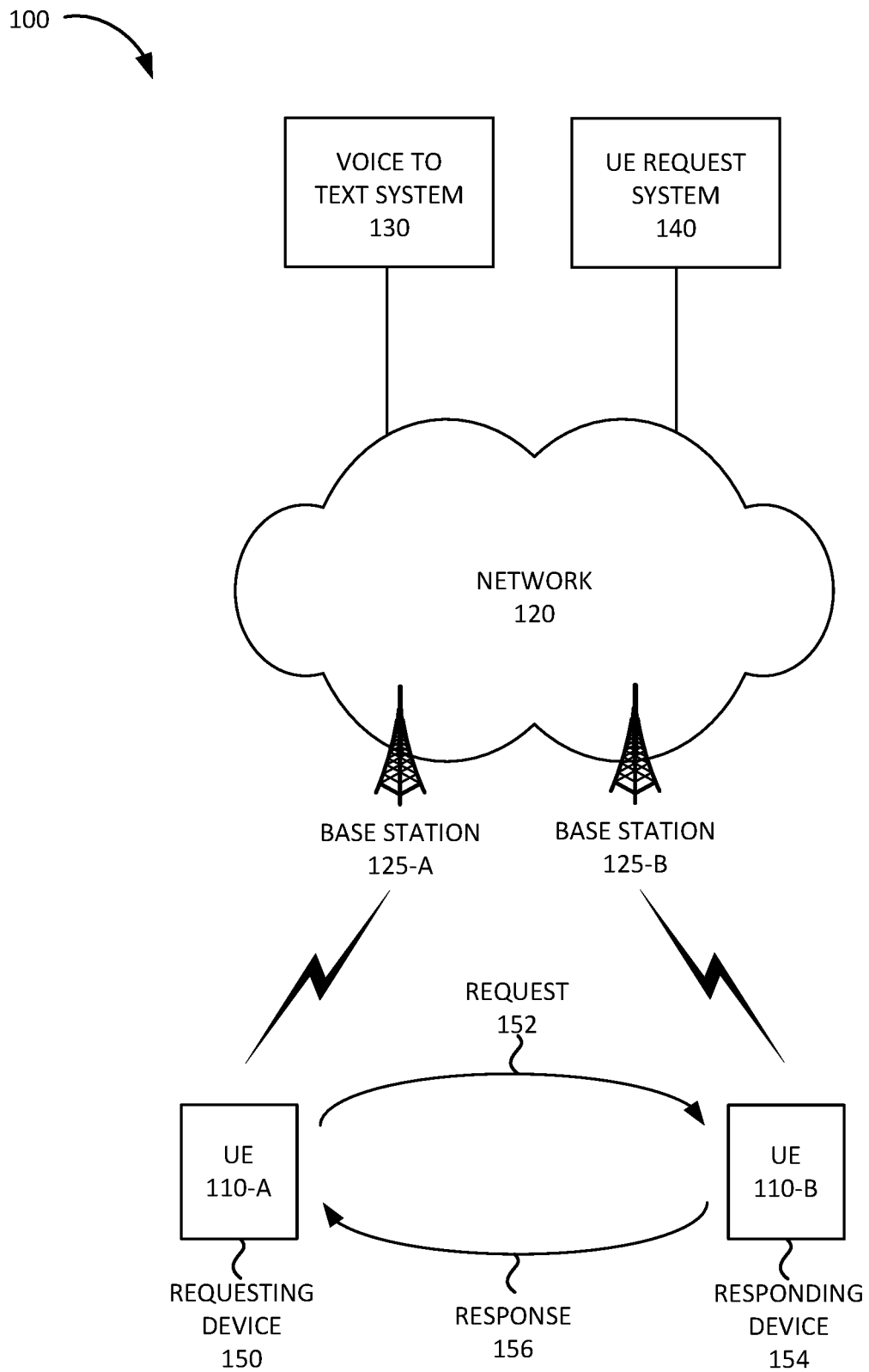
FIG. 1 is a diagram illustrating an environment according to an implementation described herein.

The following detailed description refers to the accompanying drawings. The same reference numbers in different drawings identify the same or similar elements.

A user of a user equipment (UE) device, such as, for example, a smartphone or tablet device, may desire or require information or services available via another UE device. As an example, a first UE device may have low data access privileges and a second UE device, associated with a same subscription, may have higher data access privileges. The user of the first UE device may desire to use the data connection available to the second UE device. As another example, a parent may wish to monitor the phone activities of a child and may request information from the child's phone, such as the location of the child's phone. As yet another example, the parent may wish to receive an alert from the child's phone when the phone detects that the child is in a vehicle that is exceeding a speed limit. As yet another example, a user may desire to obtain a playlist of songs from another user's tablet device. Enabling and facilitating these different types of requests between UE devices may improve a user's experience.

Implementations described herein relate to systems and methods to process voice requests from one UE device to another UE device for multiple categories of requests. A UE device may receive a voice request, convert the voice request into a text request, and send the text request to another UE device. The voice request may include a request for a service to be performed by the other UE device, a request for information stored in the other UE device, a request for device status information for the other UE device, or a request to configure the other UE device to receive an alert from the other UE device when the other UE device detects a particular trigger condition. The user device may receive a response from the other UE device providing an indication that the requested service is being or has been performed, providing the requested information stored in the other UE device, providing the requested device status information for the other UE device, or providing an indication that a requested alert has been configured in the other UE device.

In some implementations, the requesting UE device and the responding UE device may be associated with a same subscriber account (e.g., phone devices on a family service plan). In other implementations, the requesting UE device and the responding UE device may be associated with different subscriber accounts and may be members of a particular UE group or may be in each other's contact list and may provide permissions to exchange particular types of information. For example, a first UE device may permit a second UE device to request and/or share media information (e.g., a playlist of songs, etc.), bookmark information (e.g., bookmarks in a particular category), social media information (e.g., a list of contacts, etc.) and/or other types of information.

When a user initiates a voice request, the UE device may convert the voice request to a text request by sending the voice request to a "voice to text" system, convert the voice request to a text request using a native "voice to text" library stored on the UE device, or perform a combination of the two. In some implementations, the text request may be sent to a UE request system that is configured to handle UE requests from between UE devices. In other implementations, the text request may be sent over a peer-to-peer connection between the requesting UE device and the responding UE device.

The requesting UE device may identify another UE device that is the intended recipient of the request. For example, the requesting UE device may access a database of contacts to identify a contact based on a name included in the request and may identify the other UE device as a UE device associated with the identified contact.

One or more request categories may be determined for the text request based on one or more keywords included in the text request and the text request may be tagged with the determined one or more request categories. In some implementations, the tagging of the text request with the one or more request categories may be performed by the requesting UE device. In other implementations, the tagging of the text request with the one or more request categories may be performed by the UE request system. In yet other implementations, the tagging of the text request with the one or more request categories may be performed by the responding UE device that has received the text request.

The text request may be tagged with a service category that indicates that the responding UE device is to perform a service for the requesting UE device. A text request tagged with a service category may be further tagged with a type of service associated with the text request, such as, for example, request to use a network connection available to the responding UE device, a request to use an application on the responding UE device, a request to use storage space available on the responding UE device, a request to use processor resources on the responding UE device, a request that the responding UE device power down or enter an idle mode, and/or a request for another type of service.

The text request may be tagged with a device status category that indicates that the requesting UE device is requesting device status information from the responding UE device. A text request tagged with a device status category may be further tagged with a type of device status information requested, such as, for example, a request for location information for the responding UE device, a request for a speed of the responding UE device, a request for applications running on the responding UE device, a request for device statistics associated with the responding UE device, a request for the available storage space on the responding UE device, a request for information relating to a network connection available to the responding UE device (e.g., a data rate enabled based on a subscription, an available bandwidth, a signal strength, etc.), request for information relating to available computing and/or memory resources for the responding UE device, a request for other devices detected in the proximity of the responding UE device, and/or other a request for another type of device station information.

The text request may be tagged with an information request category that indicates that the requesting UE device is requesting information stored on the responding UE device. A text request tagged with an information request category may be further tagged with a type of information requested, such as, for example, a request for browser history stored in the responding UE device, a request for browser bookmarks stored in the responding UE device, a request for media information stored in the responding UE device, a request for contacts information stored in the responding UE device, a request for calendar information stored in the responding UE device, a request for wellness information stored in the responding UE device, and/or a request for other types of information stored in the responding UE device.

The text request may be tagged with an alert trigger category that indicates that the requesting UE device is requesting that the responding UE device be configured to send an alert to the requesting device when a trigger condition is detected. A text request tagged with an alert trigger category may be further tagged with a type of alert trigger requested, such as, for example, a request for an alert when a particular device status is detected (e.g., UE device is in a particular location, UE device exceeds a particular length of time using a particular application, etc.), a request for an alert when a particular piece of information is detected (e.g., a particular web site appears in a browser history, a message from a particular contact is received, a message to a particular contact is sent, etc.), and/or another type of alert request. The responding UE device may, if the requesting UE device is authorized to make the particular type of alert request, configure an alert trigger that may be triggered if the requested trigger condition is detected. In response, the responding UE device may send an alert to the requesting UE device.

In response to receiving a text request, the responding UE device may determine whether the requesting UE device is authorized to make the request. If the requesting UE device is authorized to make the request, the responding UE device may carry out the request. If the text request has not been tagged with a category tag, the responding UE device may determine one or more categories for the received text request, and may forward the text request to a particular module configured to handle the determined request category. For example, a service requests module may be configured to handle requests for a service to be performed, a device status requests module may be configured to handle requests for device status information, an information requests module may be configured to handle requests for stored information, and an alert requests module may be configured to send alerts when a trigger condition is detected for a requested alert.

A service requests module may identify a process or application associated with a requested service and may instruct or otherwise control the identified process or application to perform the requested service and may send a response to the requesting UE device indicating that the service is being performed or has been performed. A device status requests module may obtain the requested device status information by querying a particular process or storage location and may send the device status information to the requesting UE device. An information requests module may identify a storage location associated with the requested information and may obtain the requested information from the identified storage location and may send the requested information to the requesting UE device. An alerts request module may start to monitor for a trigger condition specified in an alert request and may generate an alert if the specified trigger condition is detected and sent the alert to the requesting UE device.

In some implementations, the responding UE device may perform a search of stored content to identify information relevant to a received request. For example, the responding UE device may use an information index to identify data items relevant to the received request and may provide a set of search results to the requesting UE device. The requesting UE device may then select one or more of the search results and the providing UE may provide the requested search results items to the requesting UE device. Alternatively, the responding UE device may provide data item associated with a top ranked search result in a response to the requesting UE device.

FIG. 1 is a diagram of an exemplary environment 100 in which the systems and/or methods, described herein, may be implemented. As shown in FIG. 1, environment 100 may include a first UE 110-A, a second UE 110-B, a network 120, a voice to text system 130, and a UE request system 140.

UE 110-A and UE 110-B may be referred to herein collectively as "UEs 110" and individually as "UE 110." As shown in FIG. 1, UE 110-A may correspond to a requesting device 150 that sends a request 152 to UE 110-B, which may correspond to a responding device 154. UE 110-B may respond to request 152 by sending a response 156 back to UE 110-A. Request 152 and response 156 may be sent via UE request system 140 or via a peer-to-peer connection established between UE 110-A and UE 110-B.

UE 110 may include a mobile communication device with wireless communication capabilities, such as a handheld device (e.g., mobile phone, a smart phone, a phablet device, a tablet device), a wearable computer device (e.g., a head-mounted display computer device, a wristwatch computer device, etc.), a global positioning system (GPS) device, and/or another type of wireless device; a laptop computer or another type of portable computer; a media playing device; a portable gaming system; and/or any other type of mobile computer device with wireless communication and user interface capabilities. UE 110 may include a Subscriber Identity Module (SIM) card (not shown in FIG. 1). The SIM card may store information for one or more subscriptions that may be activated for UE 110. UE 110 may wirelessly communicate with network 120.

Network 120 may enable UE 110 to communicate with voice to text system 130 and/or UE request system 140. Network 120 may include a base station 125-A and UE 110-A may wirelessly communicate with network 120 via base station 125-A. Network 120 may include a base station 125-B and UE 110-B may wirelessly communicate with network 120 via base station 125-B. In some situations, base station 125-A and base station 125-B may be the same base station. Network 120 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Network 120 may include an Internet Protocol Multimedia Subsystem (IMS) network (not shown in FIG. 1). Network 120, or part of network 120, may be managed by a provider of communication services and UE 110 may be associated with a subscription to the provider of communication services. The provider of communication services may also manage voice to text system 130 and/or UE request system 140.

Voice to text system 130 may include one or more devices, such as computer devices and/or server devices, which converts a voice request to a text request. For example, voice to text system 130 may provide an application programming interface (API) which may be used by UE 110 to send voice data to voice to text system 130 and to receive text data based on the voice data. Voice to text system 130 may, for example, break down the voice data into phonemes and may perform audio analysis to convert the phonemes into words. Voice to text system 130 may use contextual analysis to disambiguate similar sounding words to determine the correct word being spoken. Furthermore, voice to text system 130 may include a library and/or grammars configured to recognize names of people in order to generate a textual representation of spoken names of people.

UE request system 140 may include one or more devices, such as computer devices and/or server devices, which process UE requests between UE devices 110. For example, UE request system 140 may receive a request from UEs 110-A and may identify UE 110-B as the target of the request. UE request system 140 may send the request to UE 110-B and may receive a response from UE 110-B. UE request system 140 may identify UE 110-A as the target of the response and may forward the response to UE 110-A.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
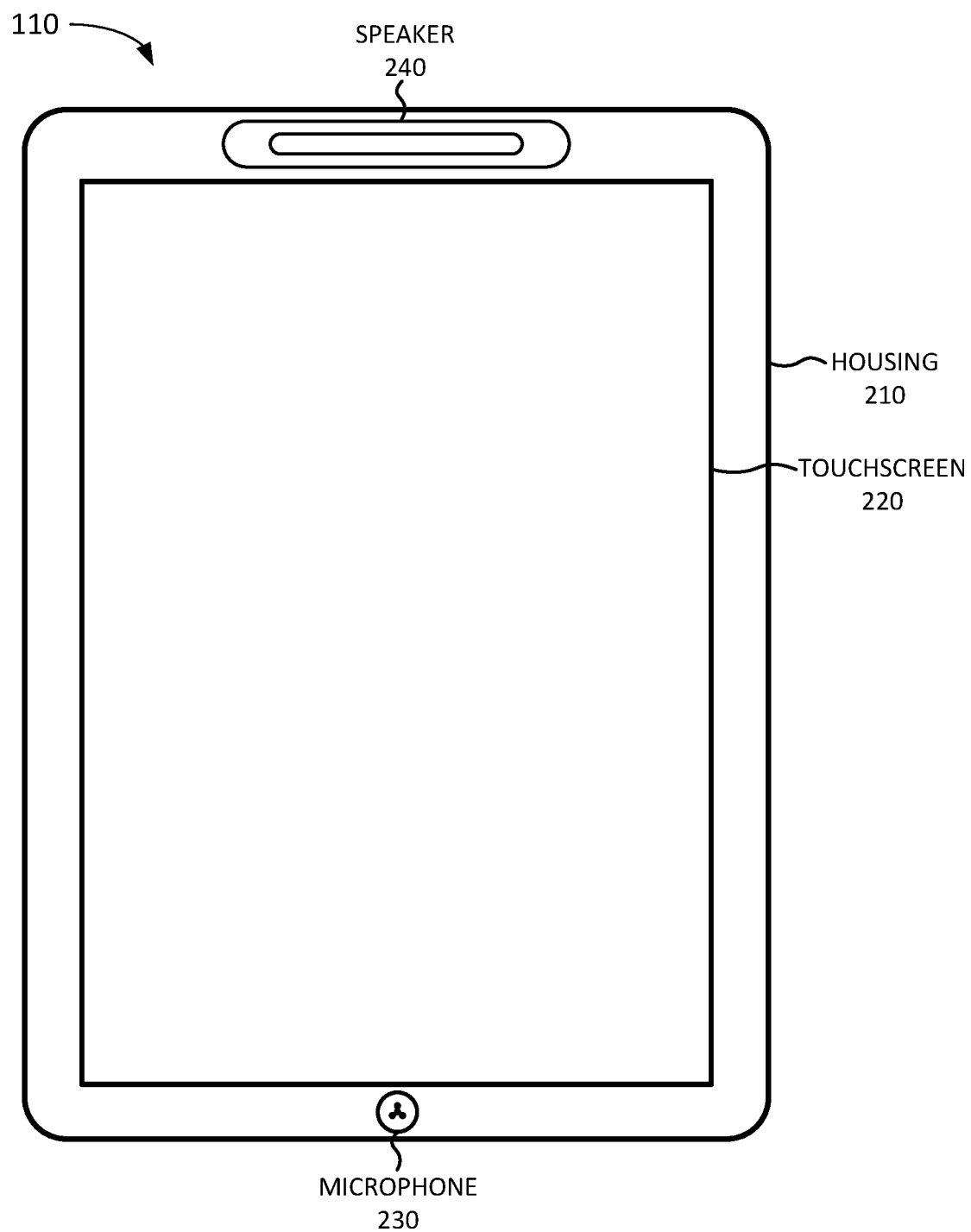
FIG. 2 is a diagram illustrating exemplary components of a mobile communication device that may correspond to the user equipment of FIG. 1.

FIG. 2 is a diagram of exemplary components of UE 110 according to an implementation. As shown in FIG. 2, UE 110 may include a housing 210, a touchscreen 220, a microphone 230, and a speaker 240.

Housing 210 may enclose UE 110 and may protect the components of UE 110 from the outside elements (e.g., moisture, dirt, etc.). Touchscreen 220 may include a display device and an input device configured to detect a user's touch. While FIG. 2 illustrates UE 110 with a touchscreen, in other implementations, UE 110 may not necessarily include a touchscreen. For example, UE 110 may include a display and a keyboard and/or keypad. Touchscreen 220 may include a liquid crystal display (LCD), an electronic ink display (e.g., an electrophoretic display), an electroluminescent display, and/or another type of display. Furthermore, touchscreen 220 may include touch sensors, such as capacitive sensors (e.g., surface capacitive sensors, projected capacitive touch sensors, etc.), resistive sensors (e.g., analog resistive sensors, digital resistive sensors, etc.), optical sensors (e.g., optical imaging sensors, rear diffused illumination sensors, infrared grid sensors, diffused surface illumination sensors, etc.), acoustic wave sensors (e.g., surface acoustic wave sensors, bending wave sensors, etc.), and/or another type of touch sensors. Furthermore, touchscreen 220 may include sensors to sense an amount of force being applied to touchscreen 220, such as piezoresistive sensors.

Microphone 230 may receive audio signals and convert the received audio signals to electrical signals for UE 110. Speaker 240 may receive electrical signals from within UE 110 and generate audio signals based on the received electrical signals.

UE 110 may include additional sensors (not shown in FIG. 2). For example, UE 110 may include one or more tilt sensors, such as accelerometers and/or gyroscopes, configured to sense a tilt, position, and/or orientation of UE 110 in space; one or more Global Positioning System (GPS) receivers; one or more magnetic field sensors (e.g., to sense the magnetic North); motion detection sensors to sense motion in the vicinity of UE 110; and/or other types of sensors.

Although FIG. 2 shows exemplary components of UE 110, in other implementations, UE 110 may include fewer components, different components, differently arranged components, or additional components than those depicted in FIG. 2. Additionally or alternatively, one or more components of UE 110 may perform functions described as being performed by one or more other components of UE 110.

Figure 3:
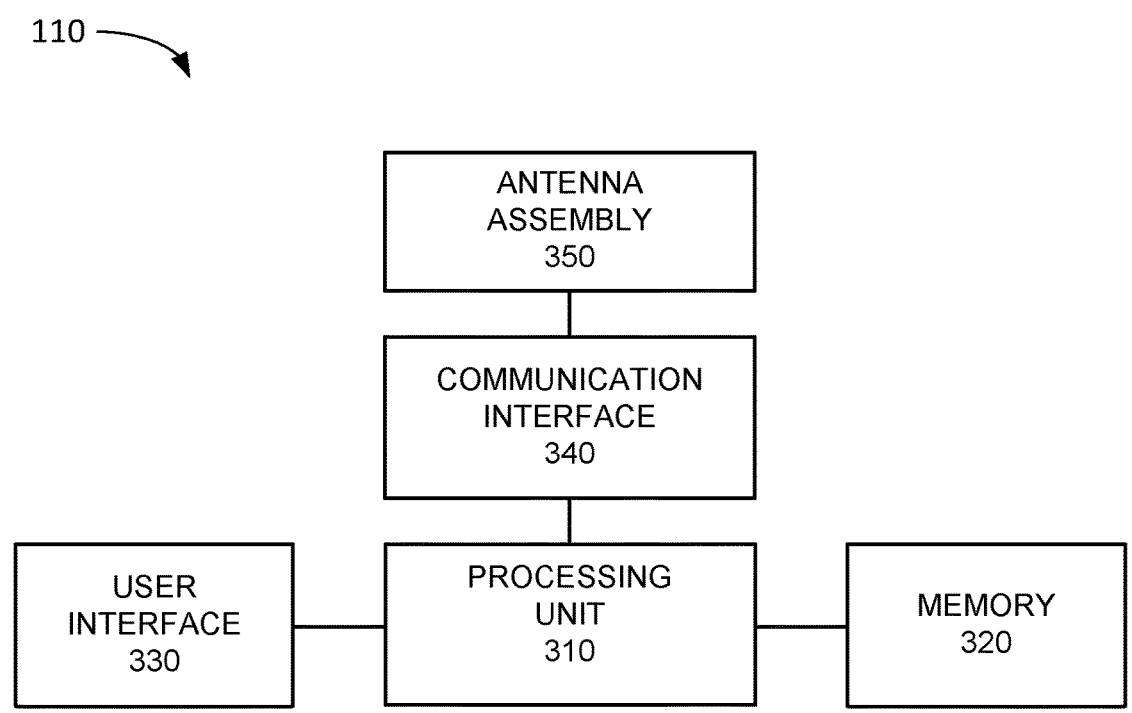
FIG. 3 is a diagram illustrating exemplary components of the user equipment (UE) device of FIG. 1.

FIG. 3 is a diagram illustrating exemplary components of a UE 110 according to an implementation described herein. As shown in FIG. 3, UE 110 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), and/or other processing logic. Processing unit 310 may control operation of UE 110 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may allow a user to input information to UE 110 and/or to output information from UE 110. Examples of user interface 330 may include a speaker to receive electrical signals and output audio signals (e.g., speaker 240); a camera to receive image and/or video signals and output electrical signals; a microphone to receive sounds and output electrical signals (e.g., microphone 230); buttons (e.g., a joystick, control buttons, a keyboard, or keys of a keypad) and/or a touchscreen to receive control commands (e.g., touchscreen 220); a display, such as an LCD, to output visual information (e.g., touchscreen 220); an actuator to cause UE 110 to vibrate; and/or any other type of input or output device.

Communication interface 340 may include a transceiver that enables UE 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals and receive RF signals and provide them to communication interface 340.

As described herein, UE 110 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 3 shows example components of UE 110, in other implementations, UE 110 may include fewer components, different components, differently arranged components, or additional components than depicted in FIG. 3. Additionally or alternatively, one or more components of UE 110 may perform the tasks described as being performed by one or more other components of UE 110.

Figure 4:
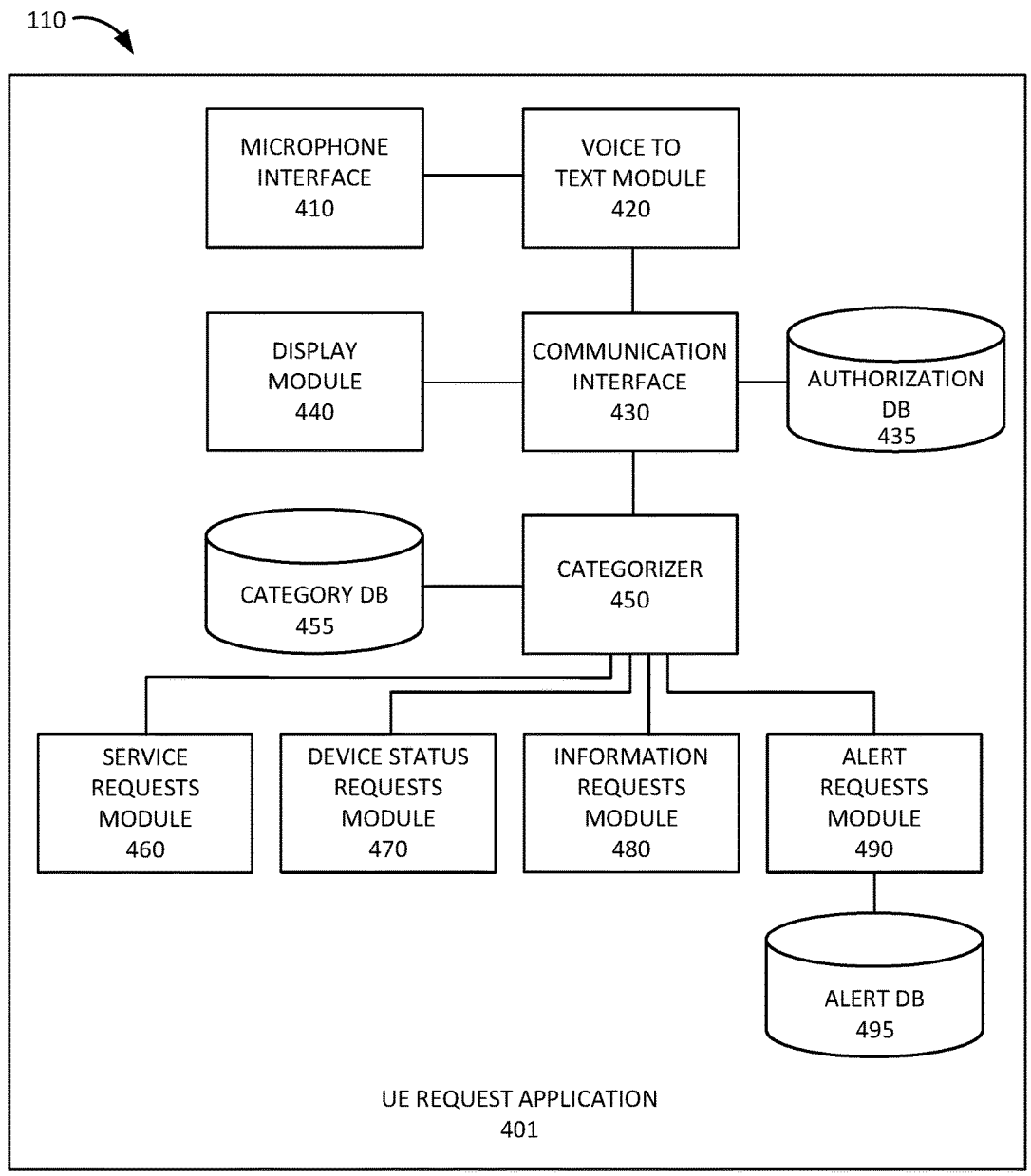
FIG. 4 is a diagram illustrating exemplary functional components of user device of FIG. 1.

FIG. 4 is a diagram illustrating exemplary functional components of UE 110 according to an implementation described herein. The functional components of UE 110 may be implemented, for example, via processing unit 310 executing instructions from memory 320. Alternatively, some or all of the functional components of UE 110 may be implemented via hard-wired circuitry. As shown in FIG. 4, UE 110 may include a UE request application 401. UE request application 401 may enable a user to make requests to another UE 110 using voice commands and/or may response to requests received from another UE 110. As shown in FIG. 4, UE request application 401 may include a microphone interface 410, a voice to text module 420, a communication interface 430, an authorization database (DB) 435, a display module 440, a categorizer 450, a category DB 455, a service requests module 460, a device status requests module 470, an information requests module 480, an alert requests module 490, and an alert DB 495.

Microphone interface 410 may interface with microphone 230 to obtain voice input spoken by the user into microphone 230. Furthermore, microphone interface 410 may perform initial signal processing to reduce noise, amplify the user's voice, and/or otherwise improve the quality of the obtained audio signal. Microphone interface 410 may provide the audio signal to voice to text module 420.

Voice to text module 420 may convert a voice request included in audio data obtained by microphone interface 410 into a text request. In some implementations, voice to text module 420 may send the audio data to voice to text system 130 and may receive, from voice to text system 130, a text request corresponding to the voice request. In other implementations, voice to text module 420 may convert some or all of the audio data into a text request locally using a native library. For example, a native voice to text library may include information that may be used to identify spoken names of contacts included in a contacts DB of UE 110. Voice to text module 420 may provide a received text request to communication interface 430.

Communication interface 430 may send a text request to UE request system 140 for another UE 110 and may receive a response from the other UE 110 via UE request system 140. Communication interface 430 may, in some implementations, identify a UE 110 that is the intended recipient of a request based on information included in the request (e.g., the name of a contact in a contact DB of UE 110). Additionally, or alternatively, communication interface 430 may establish a peer-to-peer connection with the other UE 110 and may send the text request to the other UE 110 over the peer-to-peer connection and may receive a response from the other UE 110 over the peer-to-peer connection. Furthermore, communication interface 430 may receive requests from other UEs 110 and may forward the requests to categorizer 450 to be processed. Before processing a received request from a requesting UE 110, communication interface 430 may access authorization DB 435.

Authorization DB 435 may store information relating to particular category requests that are authorized from particular UEs 110. If a particular UE 110 is not authorized to make a request tagged with a particular category, and a request tagged with the particular category is received from the particular UE 110, the request may be ignored. In some implementations, an authorization for a particular UE 110 and/or a particular category request may be time based. For example, the authorization may be valid for only a particular period of time or only during particular times of day or days of the week. As an example, a child's UE 110 may be allowed to make a service request to the parent's UE 110 to download songs only during evening hours.

Furthermore, in some implementations, communication interface 430 may alert the user, via display module 440, that an unauthorized request has been received. The user may be provided with an option to approve or reject the request. An authorization may be entered into authorization DB 435 manually by the user or may be entered into authorization DB 435 via another authorized UE 110. For example, a parent may designate UE 110-A as a master device and UE 110-B as a slave device and may give UE 110-B to a child. The parent may then use UE 110-A to set authorizations for requests to UE 110-B.

Display module 440 may generate a user interface that enables a user to voice requests. Furthermore, display module 440 may generate a user interface that includes a response received from a UE 110 responding to a sent request.

Categorizer 450 may categorize and tag a text request with one or more request categories. In some implementations, categorizer 450 may categorize and tag an outgoing text request to another UE 110. In other implementations, categorizer 450 may categorize and tag an incoming text request received from another UE 110. Categorizer 450 may categorize and tag a text request based on information stored in category DB 455. Exemplary information that may be stored in category DB 455 is described below with reference to FIG. 7.

Categorizer 450 may determine a category based on one or more keywords included in a text request and based on keywords associated with particular categories in category DB 455. In some implementations, categorizer 450 may use a decision tree to determine a category for a text request. In other implementations, categorizer 450 may use a different type of classifier on the text request, such as a Bayesian classifier, a Logistic Regression classifier, a Support Vector Machine (SVM) classifier, and/or a different type of classifier. Moreover, in some implementations, a classifier may be applied to a voice request directly, before the voice request is converted to a text request.

Categorizer 450 may, upon receiving a text request from another UE 110, determine one or more category tags included in the text request, and/or may determine one or more category tags for the text requests, may select a module to which the text request is to be forwarded for processing, and may forward the text request to the selected module (e.g., service requests module 460, device status requests module 470, information requests module 480, alert requests module 490, or another module).

Service requests module 460 may process requests for a service received from another UE 110. As an example, UE 110-A may request to use a high bandwidth connection available to UE 110-B to download a file and service requests module 460 of UE 110-B may instruct a download manager of UE 110-B to download the requested file. As another example, UE 110-A may request to use an application installed on UE 110-B to perform a task and service requests module 460 of UE 110-B may instruct the application to perform the requested task.

Device status requests module 470 may process requests for device status information received from another UE 110. As an example, UE 110-A may request location information for UE 110-B and device status requests module 470 may obtain the request location information from a GPS receiver of UE 110-B. As other examples, UE 110-A may request information for the speed at which UE 110-B is moving, for an application running on UE 110-B, for device statistics for UE 110-B, for available storage space on UE 110-B, for information relating to a network connection available to UE 110-B, for information relating to available computing or memory resources for UE 110-B, for information relating to devices detected in the proximity of UE 110-B, for information relating to the remaining battery life for UE 110-B, and/or for other types of device status information. In response, device status requests module 470 may query a corresponding process or memory location based on a device status request category of the device status request. For example, device status requests module 470 may include a mapping from a device status request category to a particular device process or memory location.

Information requests module 480 may process requests for stored information received from another UE 110. As an example, UE 110-A may request browser history information for UE 110-B and information requests module 480 may obtain the browser history from a browser application on UE 110-B. As other examples, UE 110-A may request browser bookmarks stored in UE 110-B, media information stored in UE 110-B, contacts information stored in UE 110-B, calendar information stored in UE 110-B, wellness information stored in UE 110-B (e.g., logged calories, exercise information obtained from a fitness tracker, location history information indicative of how much activity the user of UE 110-B has undertaken in a given time period, etc.), and/or other types of information stored in UE 110-B. In response, information requests module 480 may identify a storage location where the requested information is stored and/or may identify an application associated with the requested information and may instruct the identified application to provide the requested information. For example, information requests module 480 may include a mapping from an information request category to a particular storage location and/or a particular application.

In some implementations, device status requests module 470 may generate a searchable index of device status information and/or information requests module 480 may generate a searchable index of information stored on UE 110. Additionally or alternatively, device status requests module 470 and/or information requests module 480 may access an existing index on UE 110 when attempting to locate device status information or information stored on UE 110. Thus, when a request is received from another UE for device status information and/or for stored information, device status requests module 470 and/or information requests module 480 may generate a search query based on a received request, may perform a search of UE 110 using the generated search query, and may generate search results relevant to the search query. The search results may be ranked based on relevance to the search query, based on date, based on frequency of access or use, based on a user rating, and/or based on other parameters. In some implementations, the search results may be returned to the requesting UE 110 and the user of the requesting UE 110 may select to request one or more of the generated search results. In other implementations, the top ranked search result may be selected and returned to the requesting UE 110.

Alert requests module 490 may process requests to configure alerts from another UE 110. Alert requests module 490 may create a new record in alert DB 495. Alert DB 495 may store information relating to alerts that have been configured on UE 110-B. For example, a particular alert record may store information identifying a requesting UE device that requested the alert, an alert category associated with the alert, a period of time during which the alert request is active, one or more trigger conditions for the alert, and a method for sending the alert to the requesting UE device.

As an example, UE 110-A may request to be alerted when UE 110-B is moving at a speed that exceeds a posted speed limit by a particular amount and alert requests module 490 may configure the requested alert. Categorizer 450 may categorize the request in an alert request category and may categorize the type of alert request category in a location category and a navigation application information category, because alert requests module 490 may need to monitor the speed of UE 110-B based on the location information obtained by a GPS receiver and based on posted speed limit information obtained by a navigation application. Alert requests module 490 may generate a new record in alert DB 495 that identifies UE 110-B as the requesting UE device, may identify a location category and a navigation application category, and may identify a trigger condition as a speed detected over 5 miles per hour over a posted speed limit.

Although FIG. 4 shows exemplary functional components of UE 110, in other implementations, UE 110 may include fewer functional components, different functional components, differently arranged functional components, or additional functional components than depicted in FIG. 4. Additionally or alternatively, one or more functional components of UE 110 may perform functions described as being performed by one or more other functional components of UE 110.

Figure 5:
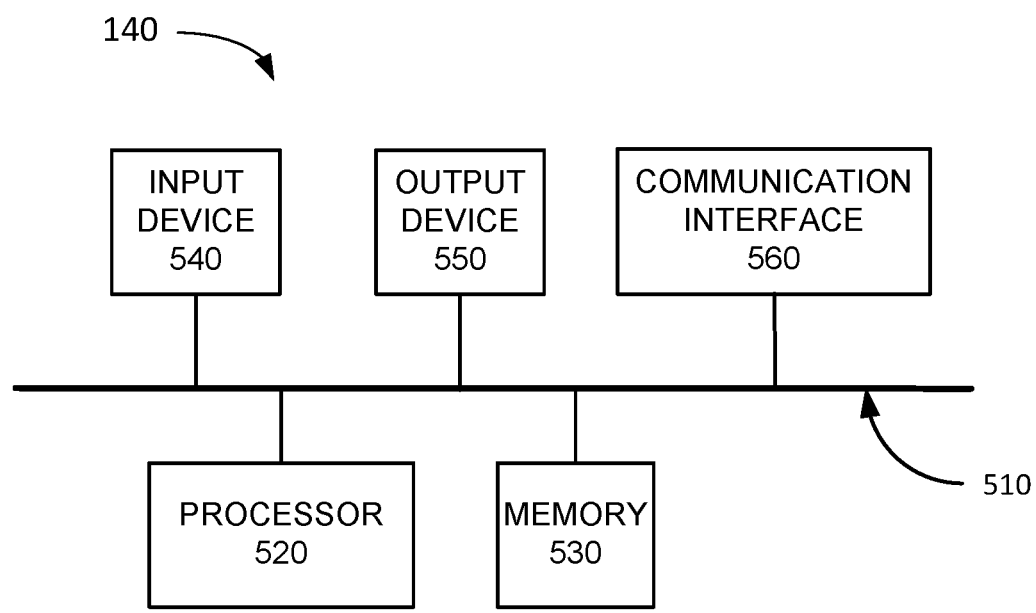
FIG. 5 is a diagram illustrating exemplary components of the UE request system of FIG. 1.

FIG. 5 is a diagram illustrating exemplary components of UE request system 140 according to an implementation described herein. As shown in FIG. 5, UE request system 140 may include a bus 510, a processor 520, a memory 530, an input device 540, an output device 550, and a communication interface 560.

Bus 510 may include a path that permits communication among the components of UE request system 140. Processor 520 may include any type of single-core processor, multi-core processor, microprocessor, latch-based processor, and/or processing logic (or families of processors, microprocessors, and/or processing logics) that interprets and executes instructions. In other embodiments, processor 520 may include an application-specific integrated circuit (ASIC), a field-programmable gate array (FPGA), and/or another type of integrated circuit or processing logic.

Memory 530 may include any type of dynamic storage device that may store information and/or instructions, for execution by processor 520, and/or any type of non-volatile storage device that may store information for use by processor 520. For example, memory 530 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 540 may allow an operator to input information into UE request system 140. Input device 540 may include, for example, a keyboard, a mouse, a pen, a microphone, a remote control, an audio capture device, an image and/or video capture device, a touch-screen display, and/or another type of input device. In some embodiments, UE request system 140 may be managed remotely and may not include input device 540. In other words, UE request system 140 may be "headless" and may not include a keyboard, for example.

Output device 550 may output information to an operator of UE request system 140. Output device 550 may include a display, a printer, a speaker, and/or another type of output device. For example, UE request system 140 may include a display, which may include a liquid crystal display (LCD) for displaying content to the customer. In some embodiments, UE request system 140 may be managed remotely and may not include output device 550. In other words, UE request system 140 may be "headless" and may not include a display, for example.

Communication interface 560 may include a transceiver that enables UE request system 140 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 560 may include a transmitter that converts baseband signals to radio frequency (RF) signals and/or a receiver that converts RF signals to baseband signals. Communication interface 560 may be coupled to an antenna for transmitting and receiving RF signals.

Communication interface 560 may include a logical component that includes input and/or output ports, input and/or output systems, and/or other input and output components that facilitate the transmission of data to other devices. For example, communication interface 560 may include a network interface card (e.g., Ethernet card) for wired communications and/or a wireless network interface (e.g., a WiFi) card for wireless communications. Communication interface 560 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, UE request system 140 may perform certain operations relating to processing requests between UEs 110. UE request system 140 may perform these operations in response to processor 520 executing software instructions contained in a computer-readable medium, such as memory 530. A computer-readable medium may be defined as a non-transitory memory device. A memory device may be implemented within a single physical memory device or spread across multiple physical memory devices. The software instructions may be read into memory 530 from another computer-readable medium or from another device. The software instructions contained in memory 530 may cause processor 520 to perform processes described herein. Alternatively, hardwired circuitry may be used in place of, or in combination with, software instructions to implement processes described herein. Thus, implementations described herein are not limited to any specific combination of hardware circuitry and software.

Although FIG. 5 shows exemplary components of device 500, in other implementations, device 500 may include fewer components, different components, additional components, or differently arranged components than depicted in FIG. 5. Additionally or alternatively, one or more components of UE request system 140 may perform one or more tasks described as being performed by one or more other components of UE request system 140.

Figure 6:
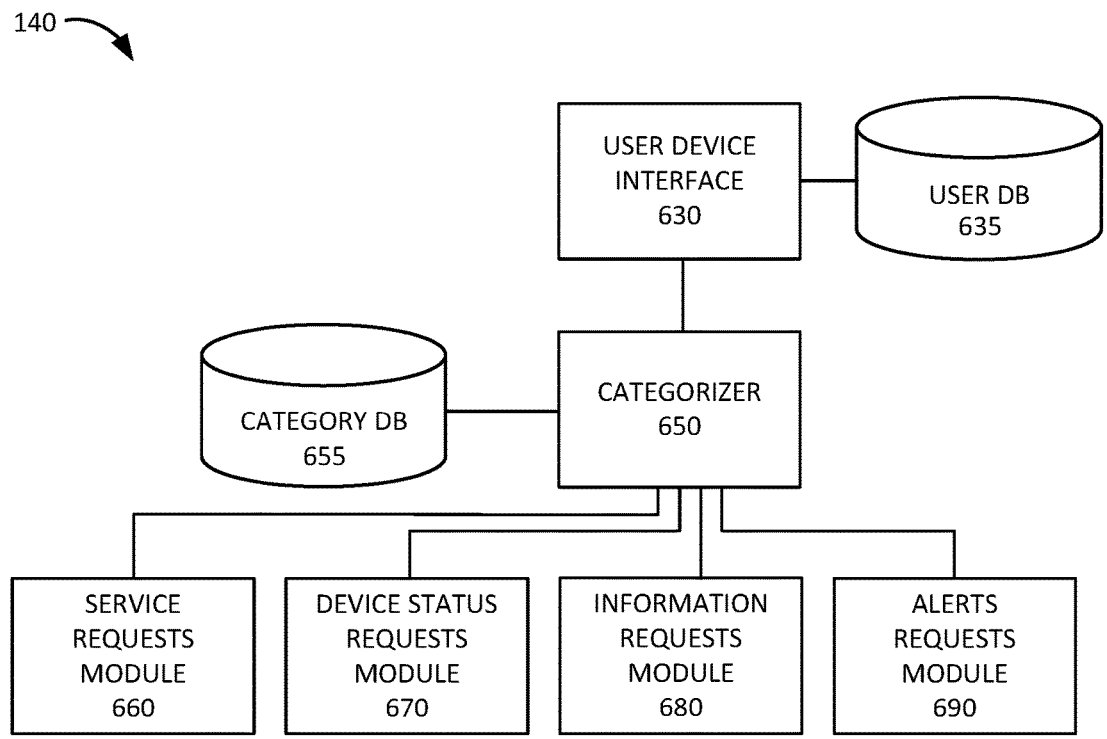
FIG. 6 is a diagram illustrating exemplary functional components of the UE request system of FIG. 1.

FIG. 6 is a diagram illustrating exemplary functional components of UE request system 140. The functional components of UE request system 140 may be implemented, for example, via processor 520 executing instructions from memory 530. Alternatively, some or all of the functional components included in UE request system 140 may be implemented via hard-wired circuitry. As shown in FIG. 6, UE request system 140 may include a user device interface 630, a user DB 635, a categorizer 650, a category DB 655, a service requests module 660, a device status requests module 670, an information requests module 680, and an alert requests module 690.

User device interface 630 may communicate with UE 110. For example, user device interface 630 may receive a text request from UE 110-A and may identify UE 110-B as an intended recipient of the received text request based on information included in the text request and based on information stored in user DB 635. User DB 635 may store information relating to particular UEs 110 and/or to particular users associated with the particular UEs 110. User DB 635 may identify, for a particular UE 110, a subscription account and other UEs 110 associated with the subscription account. User device interface 630 may, in some implementations, determine whether UE 110-A is authorized to make the received request to UE 110-B based on information stored in user DB 635. If UE 110-A is authorized to send the request to UE 110-B, user device interface 630 may forward the request to UE 110-B. Furthermore, user interface 630 may receive a response from UE 110-B responding to the request and may forward the received response to UE 110-A.

In some implementations, UE request system 140 may categorize and tag the text request in place of, or in addition to, any categorization performed by UE 110. Categorizer 650 and category DB 655 may function similarly to categorizer 450 and category DB 455 described above with reference to FIG. 4. Service requests module 660 may function similarly to service requests module 460 as described above with reference to FIG. 4 and may send instructions to UE 110-B to carry out a service associated with a request. Device status requests module 670 may function similarly to device status requests module 470 as described above with reference to FIG. 4 and may send instructions to UE 110-B to obtain device status information for a device status request. Information requests module 680 may function similarly to information requests module 480 as described above with reference to FIG. 4 and may send instructions to UE 110-B to obtain information for an information request. Alert requests module 690 may function similarly to alert requests module 490 as described above with reference to FIG. 4 and may send instructions to UE 110-B to set up an alert for an alert request.

Although FIG. 6 shows exemplary functional components of UE request system 140, in other implementations, UE request system 140 may include fewer functional components, different functional components, additional functional components, or differently arranged functional components than depicted in FIG. 6. Additionally or alternatively, one or more functional components of UE request system 140 may perform one or more tasks described as being performed by one or more other functional components of UE request system 140.

Figure 7:
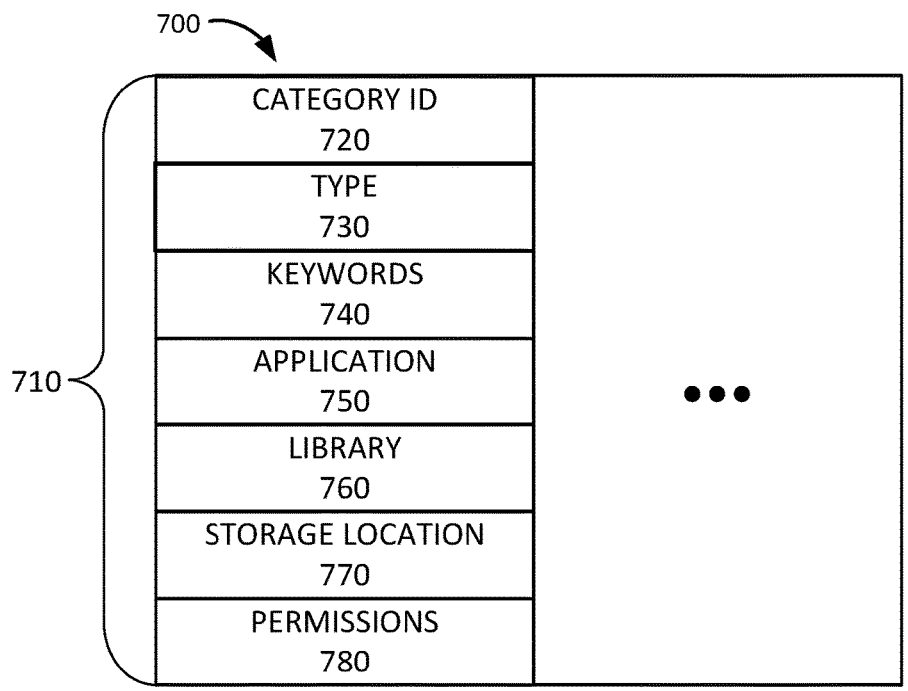
FIG. 7 is a diagram of exemplary components that may be stored in a category database that may be included in a user device or in the UE request system of FIG. 1.

FIG. 7 is a diagram of exemplary components that may be stored in a category database (BD) 700. Category DB 700 may be included in category DB 455 and/or in category DB 655. As shown in FIG. 7, category DB 700 may include one or more category records 710. Each category record 710 may store information relating to a particular request category. Category record 710 may include a category identifier (ID) field 720, a type field 730, a keywords field 740, an application field 750, a library field 760, a storage location field 770, and a permissions field 780.

Category ID field 720 may include an identifier that uniquely identifies a particular category. Type field 730 may identify one or more categories associated with the particular category. For example, type field 730 may identify a service request category and/or a category identifying a type of requested service, may identify a device status request category and/or a category identifying a particular type of devices status request, may identify a stored information request category and/or a category identifying a particular type of requested information, may identify an alert request category and/or a category identifying a particular type of alert request, and/or may identify another type of request category.

Keywords field 740 may include information identifying one or more keywords associated with the particular category. Additionally or alternatively, keywords field 740 may include other information that may be used to categorize or classify a particular request into the particular category, such as a Bayesian classifier vector, a Logistic Regression classifier vector, an SVM classifier vector, and/or other types of categorization or classification information.

Application field 750 may identify one or more applications associated with the particular category. For example, if the request category corresponds to a browser history request category, application field 750 may identify a browser application. Library field 760 may identify one or more library functions that may be used to carry out or process a request. As an example, if the particular category corresponds to a service request to download a file using a network connection, library field 760 may identify a function to perform a download of a file and to transfer the file to another UE device 110.

Storage location field 770 may identify one or more storage locations associated with the particular category. For example, if the particular category corresponds to a request for a media playlist, storage location field 770 may identify a storage location for media playlists associated with a media playing application. Permissions field 780 may identify one or more UEs 110 that are authorized to make requests associated with the particular category.

Although FIG. 7 shows exemplary fields of category DB 700, in other implementations, category DB 700 may include fewer fields, different fields, additional fields, or differently arranged fields than depicted in FIG. 7.

Figure 8:
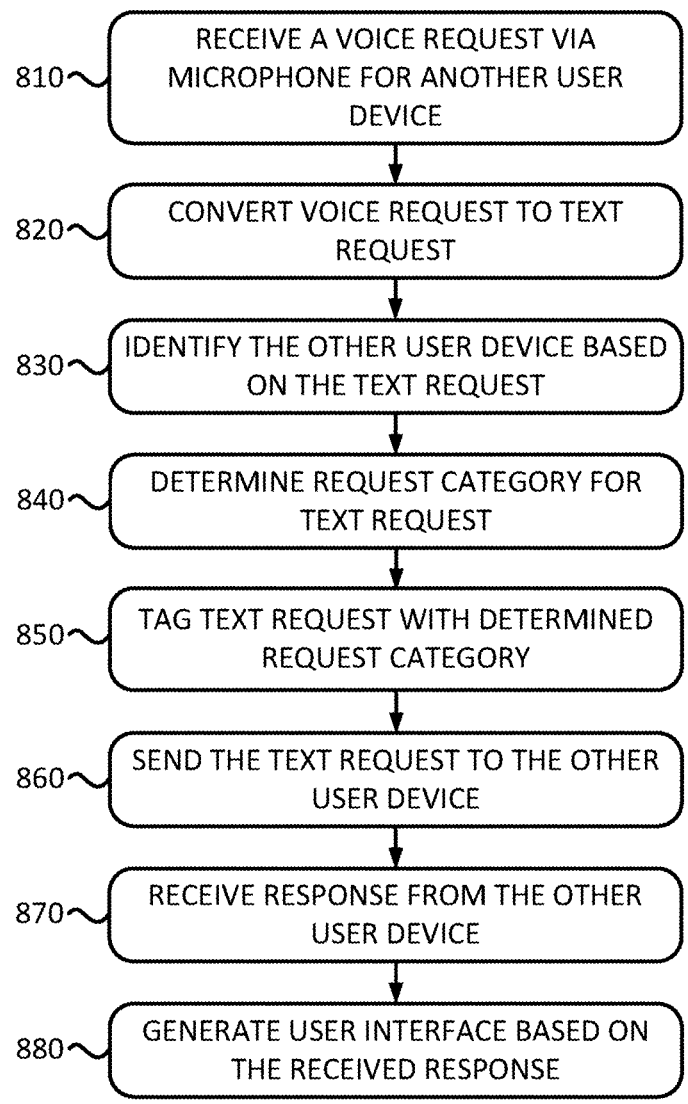
FIG. 8 is a flowchart of an exemplary process for making a request to another UE according to an implementation described herein.

FIG. 8 is a flowchart of an exemplary process for making a request to another UE according to an implementation described herein. In some implementations, the process of FIG. 8 may be performed by UE 110 (e.g., requesting UE 110-A). In other implementations, some or all of the process of FIG. 8 may be performed by another device or a group of devices separate from UE 110 or including UE 110.

The process of FIG. 8 may include receiving a voice request via a microphone, the voice request being intended for another user device, (block 810) and converting the received voice request to a text request (block 820). For example, a user may activate UE request application 401 and may speak a request into microphone 230. Voice to text module 420 may convert the voice request into a text request. In some implementations, voice to text module 420 may send the voice request audio data to voice to text system 130 and may receive a text request generated based on the voice request from voice to text system 130. In other implementations, voice to text module 420 may generate the text request locally using a native voice to text library and/or speech recognition grammars. In some implementations, the initial request may be made by the user via text and no voice to text conversion may be needed.

The other user device may be identified based on the text request (block 830). For example, in some implementations, communication interface 430 may identify a contact in a contacts DB of UE 110 based on one or more keywords included in the text request. The identified contact may be used to identify the other user device that is the intended recipient of the request based on, for example, a telephone number associated with the identified contact. In other implementations, the other user device may be identified by UE request system 140 based on one or more keywords included in the text request, after the text request is sent to UE request system 140.

A request category for the text request may be determined (block 840) and the text request may be tagged with the determined request category (block 850). For example, in some implementations, before a request is sent to the other user device, the request may be categorized by categorizer 450 using information stored in category DB 455 and tagged with one or more category tags.

The text request may be sent to the other user device (block 860) and a response may be received from the other user device (block 870). In some implementations, the text request may be sent to the other user device via UE request system 140. For example, UE 110-A may send the text request to UE request system 140 and UE request system 140 may forward the text request to UE 110-B. In other implementations, UE 110-A may send the text request to UE 110-B over a peer-to-peer connection. For example, UE 110-A may establish a wireless peer-to-peer connection with UE 110-B via base station 125. UE 110-A may establish an Internet Protocol (IP) connection to network 120 via base station 125-A and may identify an IP address associated with UE 110-B. The IP address of UE 110-B may be obtained by UE 110-A from a user DB maintained by UE request system 140 and/or another network node associated with network 120, such as a provisioning system that stores subscription information for UEs 110. UE 110-A may then send the request to the IP address of UE 110-B over a wireless data connection (e.g., using a socket to socket connection, etc.). In other implementations, UE 110-A may send the request to UE 110-B using another method, such as using a short range wireless connection (e.g., WiFi, Bluetooth, NFC connection, etc.). In yet other implementations, UE 110-A may send the request to UE 110-B using a Short Message Format (SMS) message, a Multimedia Messaging Service (MMS) message, and/or another type of message. UE 110-B may respond to the request by providing requested information, by providing an indication that a requested service is being or has been performed, or by providing an indication that an alert trigger has been configured.

A user interface may be generated based on the received response (block 880). For example, display module 440 may generate a user interface and display at least some of the information included in the received response. As an example, display module 440 may generate a user interface that includes a message informing the user that a requested service is being performed or has been performed. As another example, display module 440 may display requested device status information received from UE 110-B. As yet another example, display module 440 may display an indication that requested information has been obtained from UE 110-B (e.g., a media playlist has been copied from UE 110-B to UE 110-A). As yet another example, display module 440 may display an indication that an alert has been configured.

Figure 9:
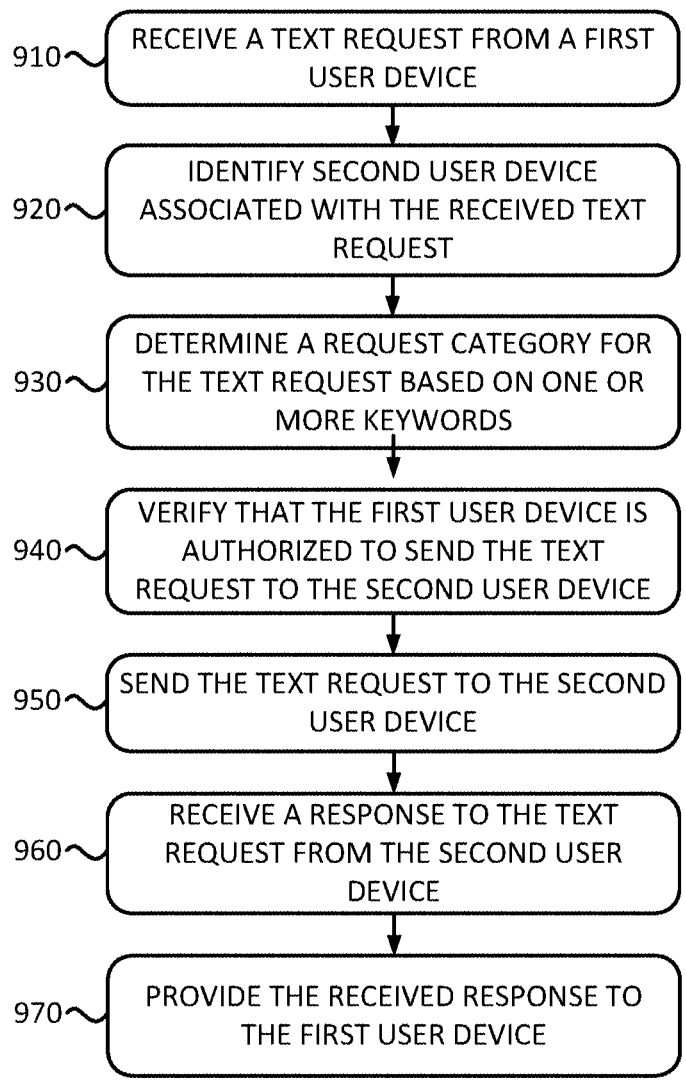
FIG. 9 is a flowchart of an exemplary process for processing a request from a first UE device to a second UE device according to an implementation described herein.

FIG. 9 is a flowchart of an exemplary process for processing a request from a first UE device to a second UE device according to an implementation described herein. In some implementations, the process of FIG. 9 may be performed by UE request system 140. In other implementations, some or all of the process of FIG. 9 may be performed by another device or a group of devices separate from UE request system 140 or including UE request system 140.

The process of FIG. 9 may include receiving a text request from a first user device (block 910) and identifying a second user device associated with the received text request (block 920). In some implementations, UE 110-A may identify UE 110-B as the intended recipient before sending the request to UE request system 140. In other implementations, UE 110-B may be identified as the intended recipient by UE request system 140. For example, UE request system 140 may receive a request from UE 110-A and may identify UE 110-B as the intended recipient of the request based on information stored in user DB 635. As an example, UE request system 140 may identify other UE s 110 associated with the same subscription as requesting UE 110-A and may disambiguate or distinguish between the other UEs 110 based on one or more keywords included in the request. As another example, user DB 635 may include some or all of the contacts associated with requesting UE 110-A, obtained with the permission of UE 110-A, and UE request system 140 may disambiguate or distinguish between the contacts associated with requesting UE 110-A to identify an intended recipient of the request. Contacts may be further disambiguated based on frequency of contact. UE request system 140 may then identify UE 110-B as the intended recipient based on the identified contact and based on information stored in user DB 635.

A request category may be determined for the text request based on one or more keywords (block 930) and a verification may be made that the first user device is authorized to send the text request to the second user device (block 940). For example, in implementations in which requesting UE 110-A does not categorize the request before sending the request to UE request system 140, categorizer 650 of UE request system 140 may categorize and tag the received request similarly to as described above with reference to blocks 840 and 850 of FIG. 8. Furthermore, categorizer 650 may verify that requesting UE 110-A is authorized to send requests of the determined category to responding UE 110-B before forwarding the request to UE 110-B.

The text request may be sent to the second user device (block 950), a response to the text request may be received from the second user device (block 960), and the received response may be provided to the first user device (block 970). For example, UE request system 140 may forward the request to the identified UE 110-B, may receive a response to the request from UE 110-B, may identify the received response as being associated with the request, may identify UE 110-A as the intended recipient of the response, and may forward the response to UE 110-A.

Figure 10:
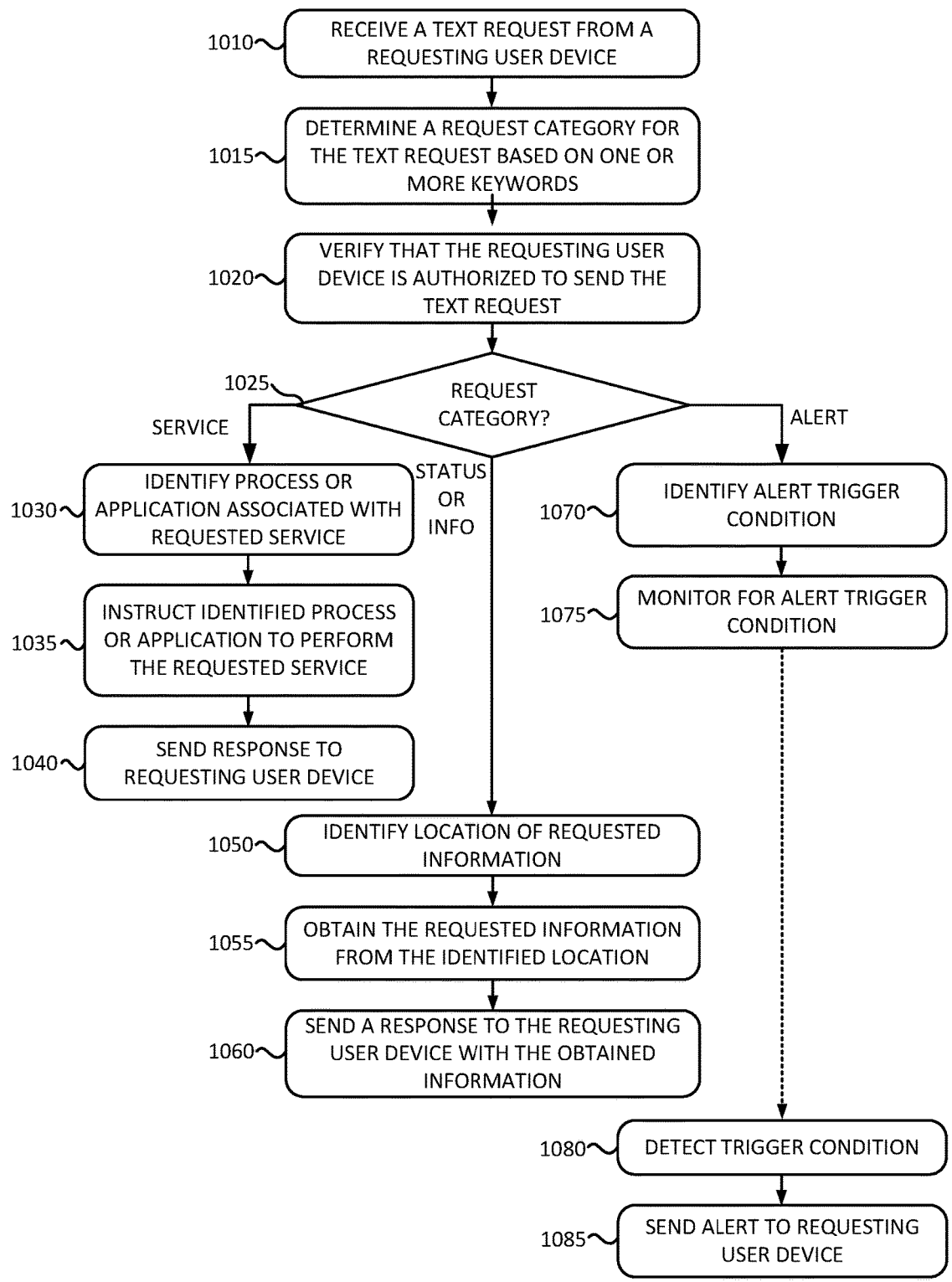
FIG. 10 is a flowchart of an exemplary process for responding to a request from another UE according to an implementation described herein.

FIG. 10 is a flowchart of an exemplary process for responding to a request from another UE according to an implementation described herein. In some implementations, the process of FIG. 10 may be performed by UE 110 (e.g., responding UE 110-B). In other implementations, some or all of the process of FIG. 10 may be performed by another device or a group of devices separate from UE 110 or including UE 110.

The process of FIG. 10 may include receiving a text request from a requesting user device (block 1010). A request category may be determined for the text request based on one or more keywords (block 1015) and a verification may be made that the first user device is authorized to send the text request to the second user device (block 1020). For example, in some implementations in which the requesting UE 110-A does not categorize and tag a request, the request may be categorized and tagged by the receiving UE 110-B. UE 110-B may categorize and tag the request similarly to as described above with respect to blocks 840 and 850 of FIG. 8.

A determination of the request category may be made (block 1025). If it is determined that the request category includes a service request category (block 1025—SERVICE), a process or an application associated with the requested service may be identified (block 1030), the identified process or application may be instructed to perform the requested service (block 1035), and a response may be sent to the requesting user device (block 1040).

For example, service requests module 460 may identify an application or process based on category information stored in category DB 455 and provided to service requests module 460 by categorizer 450. Service requests module 460 may instruct the identified application or process to perform the requested service. As an example, service requests module 460 may instruct a downloading application or utility to download a requested file using a network connection available to UE 110-B and may instruct a file transfer utility to transfer the downloaded file to requesting UE 110-A using a connection available between UE 110-A and UE 110-B. As another example, service requests module 460 may instruct a reservation application in UE 110-B to make a restaurant reservation on behalf of a user of UE 110-A. As yet another example, service requests module 460 may instruct an authentication application to perform an authentication service on behalf of UE 110-A. As yet another example, service requests module 460 may instruct UE 110-A to power down or enter an idle mode for a specified time period (e.g., during school hours, etc.). Communication interface 430 of UE 110-B may send a response back to UE 110-A, informing UE 110-A that the requested service is being performed or has been performed.

If it is determined that the request category includes a device status request category or an information request category (block 1025—STATUS OR INFO), a location of the requested information may be identified (block 1050), the requested information may be obtained from the identified location (block 1055), and a response may be sent to the requesting user device with the obtained information (block 1060). As an example, categorizer 450 may provide a device status request to device status requests module 470 and device status requests module 470 may identify a memory location that stores the requested device status information and/or may determine a library or utility function to call to obtain the requested device status information based on information stored in category DB 455. As another example, categorizer 450 may provide an information request to information requests module 480 and information requests module 480 may identify a memory location that stores the requested device status information and/or may determine a storage location where the requested information is located based on information stored in category DB 455.

In some implementations, device status requests module 470 and/or information requests module 480 may generate a search query based on a received request, may perform a search of UE 110 using the generated search query, and may generate search results relevant to the search query. The search results may be ranked based on relevance to the search query, based on date, based on frequency of access or use, based on a user rating, and/or based on other parameters. In some implementations, the search results may be returned to the requesting UE 110 and the user of the requesting UE 110 may select to request one or more of the generated search results. In other implementations, the top ranked search result may be selected and returned to the requesting UE 110.

If it is determined that the request category includes an alert request category (block 1025—ALERT), an alert trigger condition may be identified (block 1070) and monitoring for the alert trigger condition may begin (block 1080). For example, alert requests module 490 may generate a new alert record in alert DB 495 that includes information identifying a requesting UE device that requested the alert, an alert category associated with the alert, a period of time during which the alert request is active, one or more trigger conditions for the alert, one or more memory locations, device processes, and/or applications that are to be monitored, and a method for sending the alert to the requesting UE device. Alert requests module 490 may start monitoring the specified memory locations, device processes, and/or applications for the specified one or more trigger conditions. For example, alert requests module 490 may check the specified memory locations, device processes, and/or applications at particular intervals to determine whether the specified one or more trigger conditions are detected.

At a later time, the trigger condition may be detected (block 1080) and an alert may be sent to the requesting user device (block 1085). For example, alert requests module 490 may send an alert to UE 110-A over a peer-to-peer connection or via UE request system 140 when the one or more trigger conditions are detected. Additionally or alternatively, alert requests module 490 may send an alert using a method specified in the alert request, such as an SMS message, an MMS message, and/or another type of message.

Figure 11A:
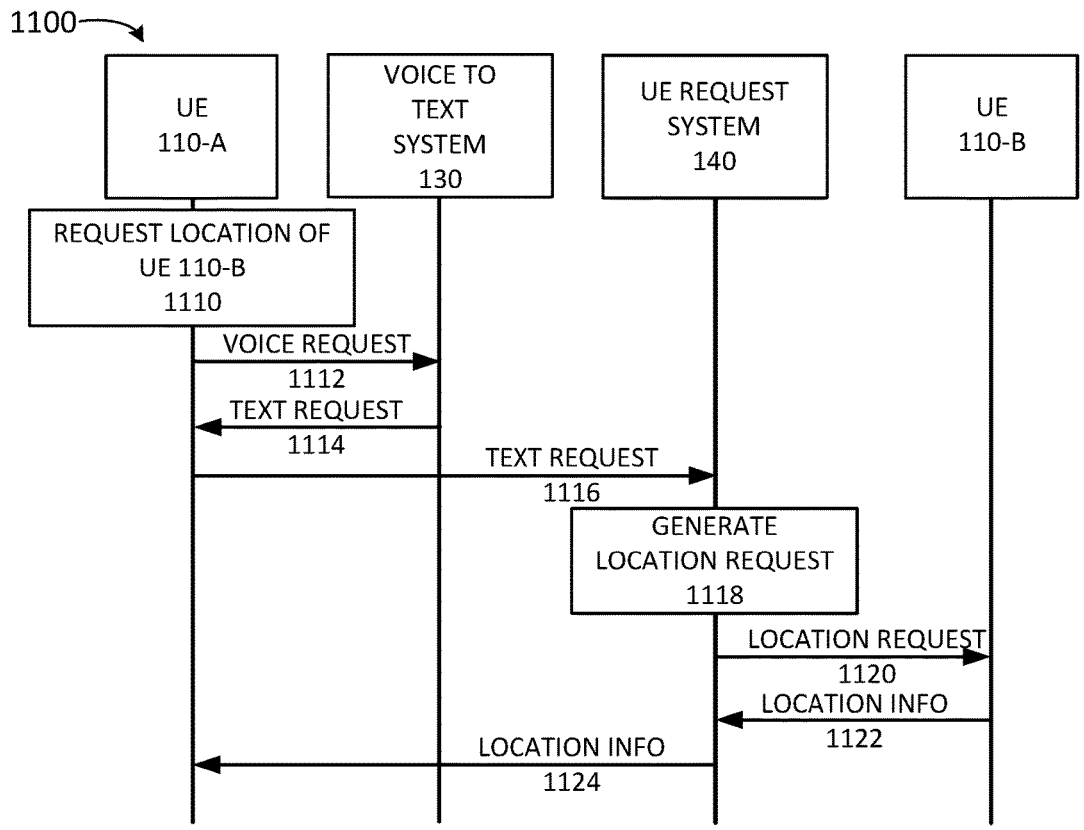
FIG. 11A is a first exemplary signal flow diagram according to an implementation described herein.

FIG. 11A is a first exemplary signal flow diagram 1100 according to an implementation described herein. In signal flow diagram 1100, a parent may use UE 110-A to request the location of a child's phone 110-B. The parent may speak the voice request "Where is Peter's phone right now?" (block 1110) and UE 110-A may send the voice request audio data to voice to text system 130 (signal 1112). Voice to text system 130 may convert the voice request into a text request "Where is Peter's phone right now" and may return the text request to UE 110-A (signal 1114). UE 110-A may send the text request to UE request system 140 (signal 1116). UE request system 140 may receive the text request and may identify UE 110-B as the intended recipient based on the term "Peter" included in the text request and based on contact information associated with UE 110-A and included in user DB 635 of UE request system 140.

UE request system 140 may further categorize the request as a device status request and may categorize the device status request as a location request (e.g., based on the terms "where is" and "phone"). Categorizer 650 may provide the request to device status requests module 670 and device status requests module 670 may select to generate a location request (block 1118) and send the location request to UE 110-B (signal 1120). UE 110-B may respond with information identifying the current location (signal 1122) and UE request system 140 may forward the location information to UE 110-A (signal 1124).

Figure 11B:
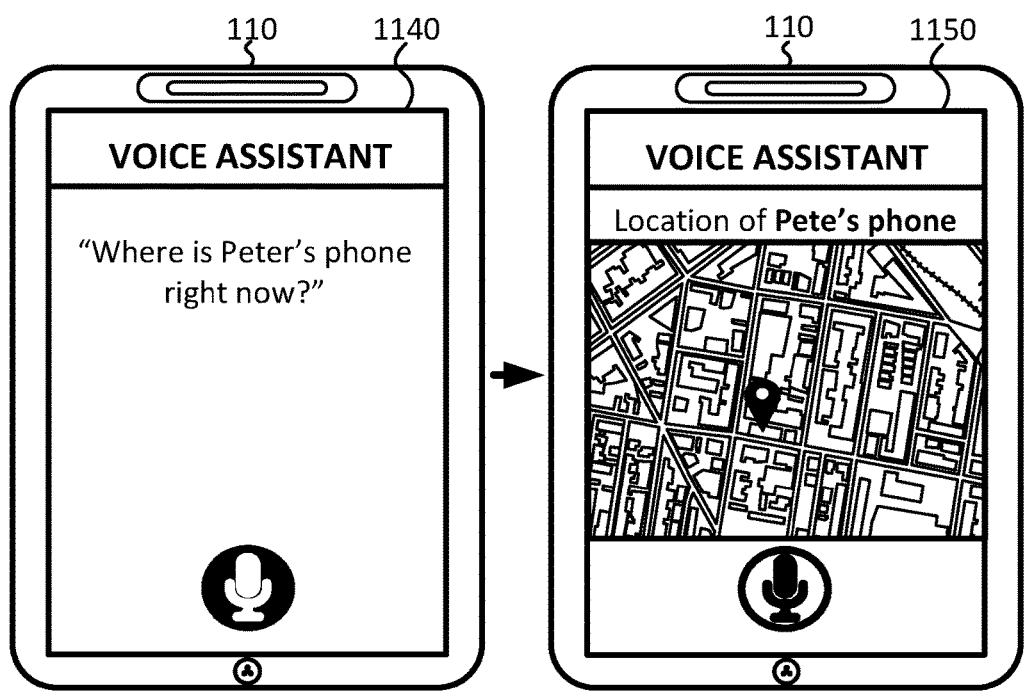
FIG. 11B is a diagram of exemplary user interfaces associated with the signal flow diagram of FIG. 11A.

FIG. 11B is a diagram of exemplary user interfaces associated with signal flow diagram 1100. UE 110-A may generate user interface 1140 that displays the text request generated based on the voice request spoken by the user. After receiving the response, UE 110-A may generate user interface 1150 that includes a map displaying the location of UE 110-B.

Figure 12A:
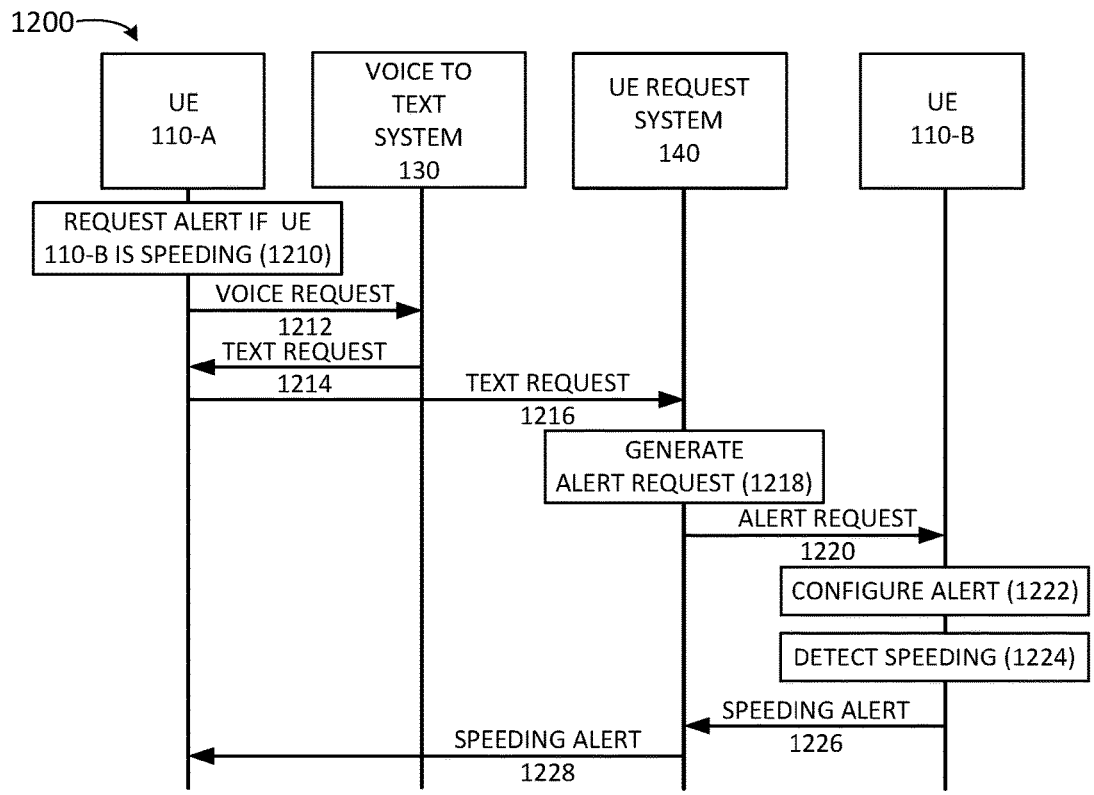
FIG. 12A is a second exemplary signal flow diagram according to an implementation described herein.

FIG. 12A is a second exemplary signal flow diagram 1200 according to an implementation described herein. In signal flow diagram 1200, a parent may use UE 110-A to request to be alerted if a child is speeding. The parent may speak the voice request "Alert me if Peter's phone detects speeding" (block 1210) and UE 110-A may send the voice request audio data to voice to text system 130 (signal 1212). Voice to text system 130 may convert the voice request into a text request "Alert me if Peter's phone detects speeding" and may return the text request to UE 110-A (signal 1214). UE 110-A may send the text request to UE request system 140 (signal 1216). UE request system 140 may receive the text request and may identify UE 110-B as the intended recipient based on the term "Peter" included in the text request and based on contact information associated with UE 110-A and included in user DB 635 of UE request system 140.

UE request system 140 may further categorize the request as an alert request (e.g., based on the terms "alert me") and may categorize the alert request as a device status alert request (e.g., based on the term "speeding"). Categorizer 650 may provide the request to alert requests module 690 and alert requests module 690 may generate an alert request (block 1218) and send the alert request to UE 110-B (signal 1220). UE 110-B may configure an alert based on the received alert request (block 1222). For example, UE 110-B may measure the speed of UE 110-B, based on a set of GPS locations, at particular time intervals or in response to detecting a speed faster than a walking speed (e.g., faster than 5 miles per hour). Furthermore, UE 110-B may obtain a posted speed limit for a location of UE 110-B using a navigation or traffic application and may compare the measured speed with the posted speed.

In response to detecting a speed that is at least 5 miles per hour faster than the posted speed limit, UE 110-B may detect speeding (block 1224) and may send an alert to UE request system 140 (signal 1226). UE request system 140 may forward the alert to UE 110-A (signal 1228) and UE 110-A may display the alert to the user.

Figure 12B:
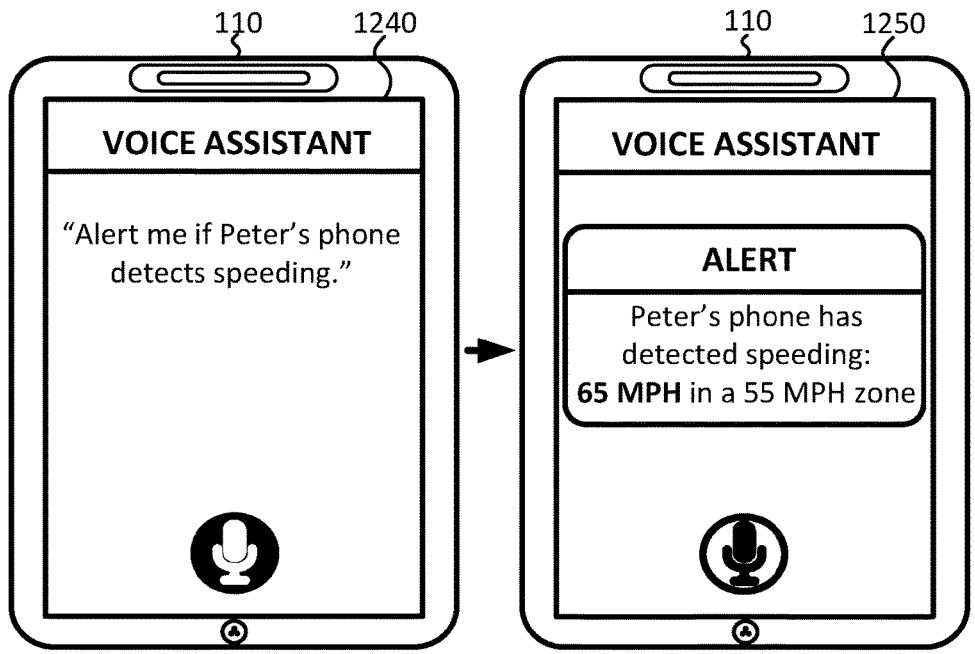
FIG. 12B is a diagram of exemplary user interfaces associated with the signal flow diagram of FIG. 12A.

FIG. 12B is a diagram of exemplary user interfaces associated with signal flow diagram 1200. UE 110-A may generate user interface 1240 that displays the text request generated based on the voice request spoken by the user. After receiving an alert, UE 110-A may generate user interface 1250 that displays an alert indicating that UE 110-B has detected speeding.

Figure 13A:
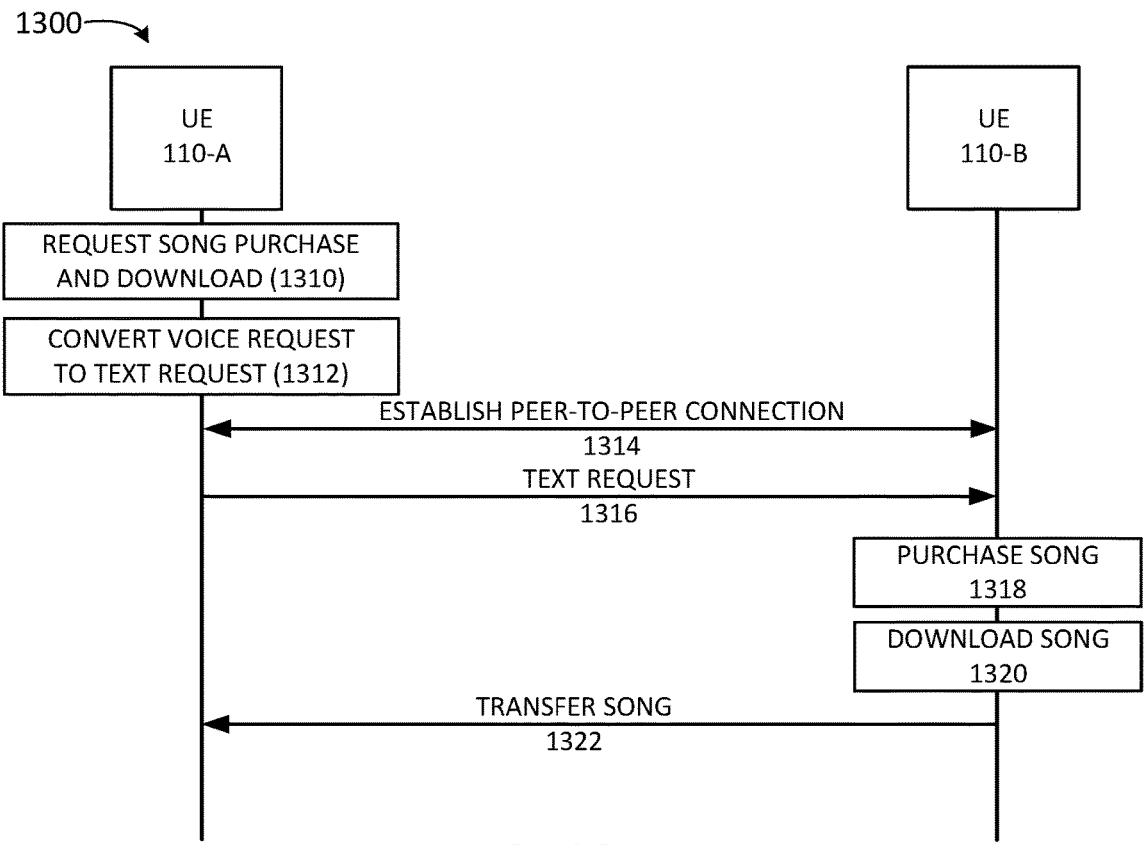
FIG. 13A is a third exemplary signal flow diagram according to an implementation described herein.

FIG. 13A is a third exemplary signal flow diagram 1300 according to an implementation described herein. In signal flow diagram 1300, a child may use UE 110-A to request to download a song using the parent's phone UE 110-B, because the child's phone 110-A may only be authorized to purchase and download songs through the parent's phone to enable the parent to monitor such purchases. The child may speak the voice request "Buy and download song through mom's phone" (block 1310) and UE 110-A may use a native voice to text library to convert the voice request audio data into a text request "Buy and download song through mom's phone" (block 1312). UE 110-A may identify UE 110-B as the intended recipient of the request based on the terms "mom's phone" and may establish a peer-to-peer connection with UE 110-B (signal 1314). For example, UE 110-A and UE 110-B may both be located inside a customer premises location with a WiFi access point and may be able to communicate via WiFi. UE 110-A may establish the peer-to-peer connection over WiFi and may send the text request to UE 110-B (signal 1316). UE 110-B may categorize the text request as a service request and may categorize the service request as a media application service request. Services requests module 460 may identify a media application and may generate a user interface that enables UE 110-A to interact with the media application over the peer-to-peer connection. The child may select a song to purchase and download and UE 110-B may purchase and download the song for UE 110-A (blocks 1318 and 1320). UE 110-B may then transfer the downloaded song to UE 110-A over the peer-to-peer connection (signal 1322).

Figure 13B:
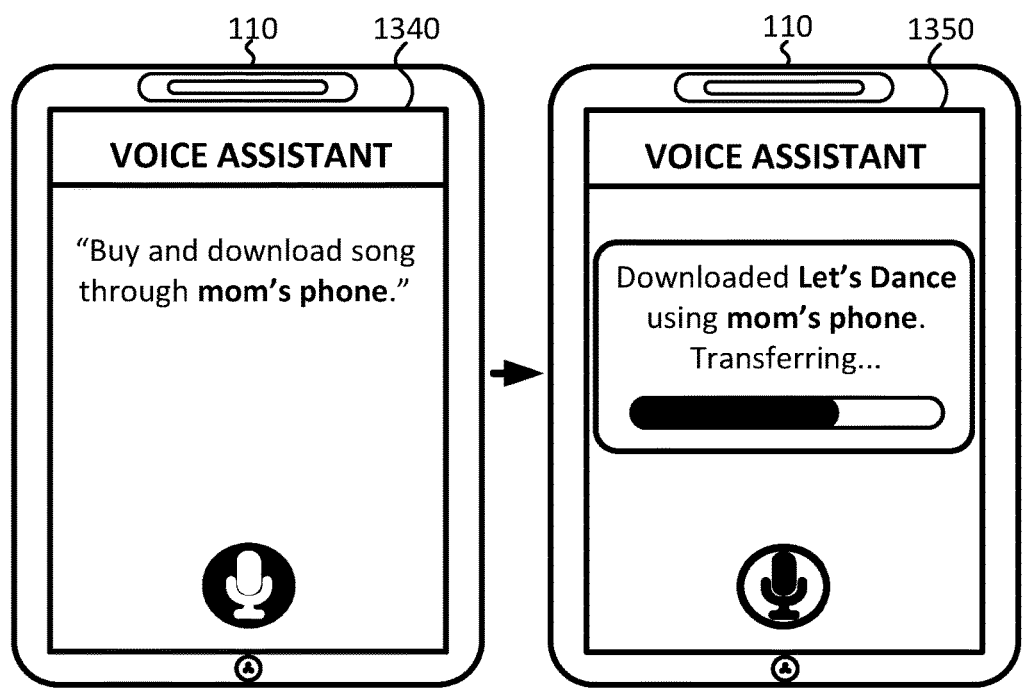
FIG. 13B is a diagram of exemplary user interfaces associated with the signal flow diagram of FIG. 13A.

FIG. 13B is a diagram of exemplary user interfaces associated with signal flow diagram 1300. UE 110-A may generate user interface 1340 that displays the text request generated based on the voice request spoken by the user. After receiving a response, UE 110-A may generate user interface 1350 that displays an indication that the requested song is being downloaded using UE 110-B.

Figure 14A:
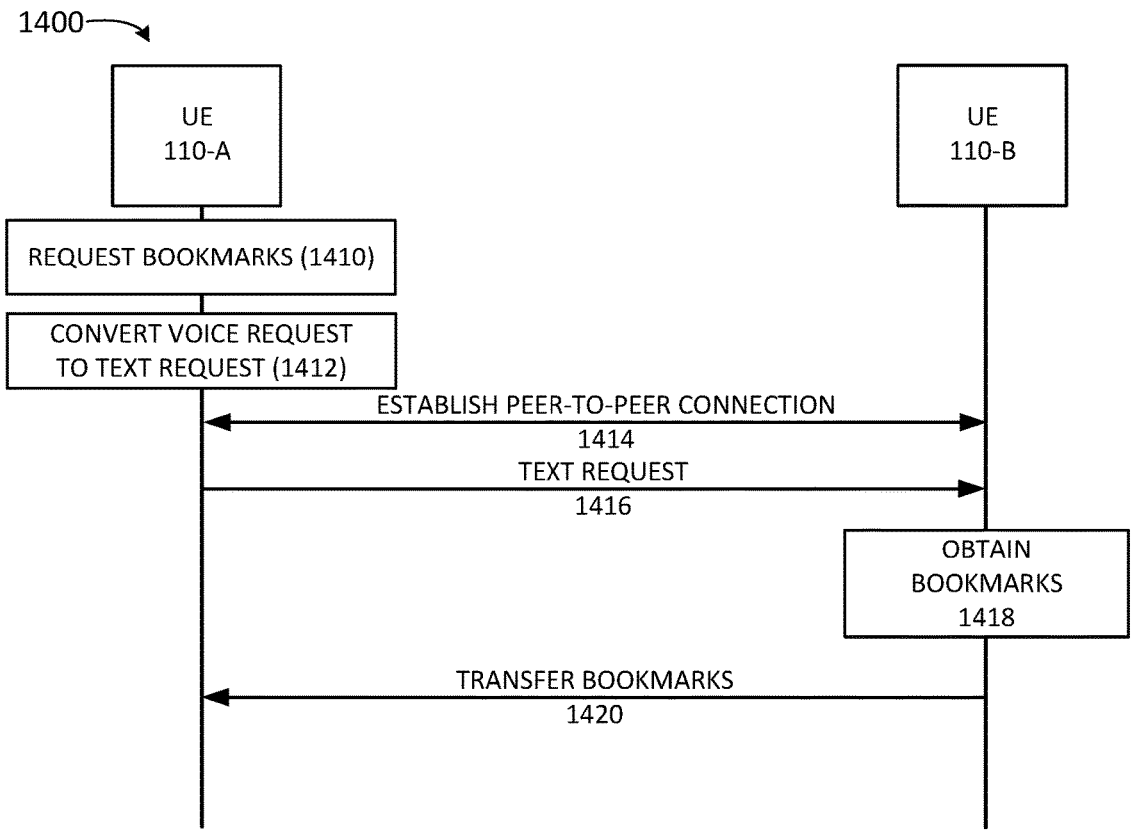
FIG. 14A is a fourth exemplary signal flow diagram according to an implementation described herein.

FIG. 14A is a fourth exemplary signal flow diagram 1400 according to an implementation described herein. In signal flow diagram 1400, a first user may use UE 110-A to request browser bookmarks for a particular category (e.g., news sites) from a second user in the first user's contact list and associated with UE 110-B. The first user may speak the voice request "Copy John Smith's news bookmarks" (block 1410) and UE 110-A may use a native voice to text library to convert the voice request audio data into a text request "Copy John Smith's news bookmarks" (block 1412). UE 110-A may identify UE 110-B as the intended recipient of the request based on the terms "John Smith" and based on the information stored in a contacts DB of UE 110-A, and may establish a peer-to-peer connection with UE 110-B (signal 1414). For example, UE 110-A may determine the IP address of UE 110-B by querying a particular network node that facilitates peer-to-peer communication between UEs 110. UE 110-A may then send a connection request to the determined IP address over base station 125 and UE 110-B may respond to establish the peer-to-peer connection.

UE 110-A may send the text request to UE 110-B over the peer-to-peer connection (signal 1416) and UE 110-B may categorize the text request as an information request and may categorize the information request as a browser application information request. Information requests module 480 may identify a storage location where a browser application stores bookmarks and may identify a folder that includes bookmarks categorized as news bookmarks. Information requests module 480 may obtain the news bookmarks (block 1418) and may then transfer the obtained news bookmarks to UE 110-A over the peer-to-peer connection (signal 1420).

Figure 14B:
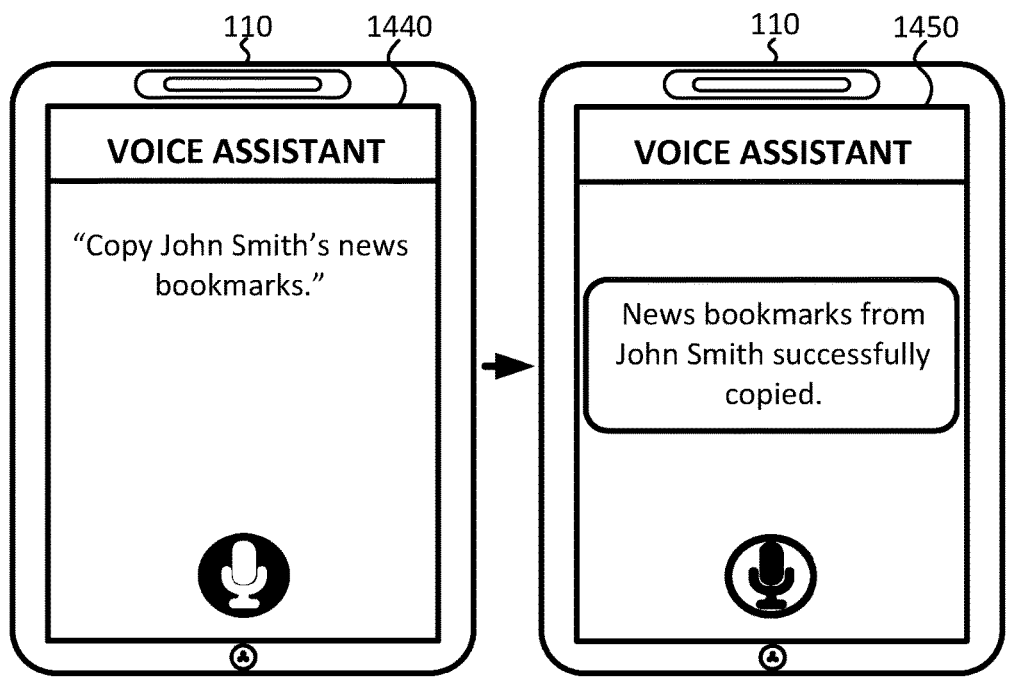
FIG. 14B is a diagram of exemplary user interfaces associated with the signal flow diagram of FIG. 14A.

FIG. 14B is a diagram of exemplary user interfaces associated with signal flow diagram 1400. UE 110-A may generate user interface 1440 that displays the text request generated based on the voice request spoken by the user. After receiving the bookmarks, UE 110-A may generate user interface 1450 that displays an indication that the bookmarks have been copied from UE 110-B.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while series of blocks have been described with respect to FIGS. 8, 9, and 10, and series of signal flows have been described with respect to FIGS. 11A, 12A, 13A, and 14A, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a wireless communication device, the method comprising:
   receiving, by the wireless communication device, a voice request from a user via a microphone, wherein the voice request requests information associated with another wireless communication device or a service to be performed by the other wireless communication device;
   identifying, by the wireless communication device, the other wireless communication device;
   converting, by the wireless communication device, the received voice request into a text request;
   determining, by the wireless communication device, a request category for the voice request based on one or more keywords included in the text request;
   tagging, by the wireless communication device, the text request with a category tag associated with the determined request category;
   sending, by the wireless communication device, the text request to the other wireless communication device; and
   receiving, by the wireless communication device, a response from the other wireless communication device, wherein the response includes the requested information or an indication that the service has been performed.

2. The method of claim 1, wherein the request category includes a category indicating a request to perform a service by the other wireless communication device.

3. The method of claim 1, wherein the request category includes a category indicating a request to access information stored in the other wireless communication device.

4. The method of claim 3, wherein the category indicating a request to access information stored in the other wireless communication device includes a category indicating:
   a request for browser history of the other wireless communication device;
   a request for media information stored in the other wireless communication device;
   a request for contacts information stored in the other wireless communication device;
   a request for calendar information stored in the other wireless communication device; or
   a request for wellness information stored in the other wireless communication device.

5. The method of claim 1, wherein the request category includes a category indicating a request for device status information associated with the other wireless communication device.

6. The method of claim 5, wherein the category indicating a request for device status information associated with the other wireless communication device includes a category indicating:

a request for location information for the other wireless communication device;

a request for a speed of the other wireless communication device;

a request for applications running on the other wireless communication device;

a request for device statistics associated with the other wireless communication device; or a request for other devices detected in a proximity of the other wireless communication device.

7. The method of claim 1, wherein the request category includes a category indicating a request to configure an alert trigger in the other wireless communication device.

8. The method of claim 7, further comprising:

receiving an alert from the other wireless communication device, wherein the alert includes information indicating that a trigger condition associated with the request to configure the alert trigger has been detected by the other wireless communication device.

9. The method of claim 1, wherein sending the text request to the other wireless communication device includes:

sending the text request to a user equipment request system device configured to manage requests between wireless communication devices.

10. The method of claim 1, further comprising:

establishing a peer-to-peer connection between the wireless communication device and the other wireless communication device; and wherein sending the text request to the other wireless communication device includes:

sending the text request over the established peer-to-peer connection.

11. The method of claim 1, wherein the wireless communication device and the other wireless communication device are associated with a same subscriber account.

12. The method of claim 1, further comprising:

receiving another text request from the other wireless communication device;

determining another request category for the other text request based on one or more keywords included in the other text request;

authorizing the other text request based on an authorization setting associated with the determined other request category; and processing the other text request based on the determined other request category.

13. The method of claim 12, wherein the other text request includes a request to use a network connection available to the wireless communication device, and wherein processing the other text request based on the determined other request category includes:

enabling the other wireless communication device to use the network connection.

14. The method of claim 12, wherein the other text request includes a request for information stored in the wireless communication device, and wherein processing the other text request based on the determined other request category includes:

identifying a location where the request information is stored based on the determined other request category;

obtaining the requested information from the identified location; and providing the requested information to the other wireless communication device.

15. The method of claim 12, wherein the other text request includes a request for an alert trigger based on a specified trigger condition, the method further comprising:

configuring the wireless communication device to monitor for the specified trigger condition;

detecting the specified trigger condition; and sending an alert to the other wireless communication device indicating that the specified trigger condition has been detected.

16. A wireless communication device comprising:

logic configured to:

receive a voice request from a user via a microphone, wherein the voice request includes a request to access information stored in another wireless communication device, a request for device status information associated with the other wireless communication device, or a request to configure an alert trigger in the other wireless communication device;

identify the other wireless communication device;

convert the received voice request into a text request;

determine a request category for the voice request based on one or more keywords included in the text request;

tag the text request with a category tag associated with the determined request category;

send the text request to the other wireless communication device; and receive a response from the other wireless communication device, wherein the response includes the requested information stored in the other wireless communication device, the requested device status information, or an indication that the requested alert trigger has been configured.

17. The wireless communication device of claim 16, further comprising logic configured to:

receive another text request from the other wireless communication device, wherein the other text request includes a request for information stored in the wireless communication device;

determine another request category for the other text request based on one or more keywords included in the other text request;

authorize the other text request based on an authorization setting associated with the determined other request category;

identify a location where the requested information is stored based on the determined other request category;

obtain the requested information from the identified location; and provide the requested information to the other wireless communication device.

18. The wireless communication device of claim 16, further comprising logic configured to:

receive another text request from the other wireless communication device, wherein the other text request includes a request to configure an alert trigger based on a specified trigger condition;

configure the wireless communication device to monitor for the specified trigger condition;

detect the specified trigger condition; and send an alert to the other wireless communication device indicating that the specified trigger condition has been detected.

19. A system comprising:

logic configured to:

receive a text request from a first wireless communication device via a first Internet Protocol (IP) connection over a network, wherein the text request includes a request to access information stored in a second wireless communication device, a request for device status information associated with the second wireless communication device, or a request to configure an alert trigger in the second wireless communication device;

identify the second wireless communication device associated with the received text request;

determine a request category for the text request based on one or more keywords included in the text request;

generate a verification that the first wireless communication device is authorized to send the text request to the second wireless communication device based on the request category;

send, via a second IP connection over the network, the text request to the second wireless communication device based on the verification;

receive, via the second IP connection, a response to the text request from the second wireless communication device, wherein the response includes the requested information stored in the second wireless communication device, the requested device status information, or an indication that the requested alert trigger has been configured; and forward, via the first IP connection, the received response to the first wireless communication device.

* * * * *